US011816590B2

(12) United States Patent
Alam et al.

(10) Patent No.: US 11,816,590 B2
(45) Date of Patent: *Nov. 14, 2023

(54) MONITORED MACHINE PERFORMANCE AS A MAINTENANCE PREDICTOR

(71) Applicant: THE BOEING COMPANY, Chicago, IL (US)

(72) Inventors: Shahriar Alam, Chandler, AZ (US); Qin Jiang, Oak Park, CA (US); Franz D. Betz, Renton, WA (US); Tsai-Ching Lu, Thousand Oaks, CA (US); John E. Harrison, Bellevue, WA (US); John L. Ross, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 635 days.

This patent is subject to a terminal disclaimer.

(21) Appl. No.: 16/782,480

(22) Filed: Feb. 5, 2020

(65) Prior Publication Data
US 2020/0175407 A1 Jun. 4, 2020

Related U.S. Application Data

(63) Continuation of application No. 15/169,233, filed on May 31, 2016, now Pat. No. 10,558,929.

(51) Int. Cl.
*G06N 7/00* (2023.01)
*G06Q 10/00* (2023.01)
*G06F 17/11* (2006.01)
*G06N 7/01* (2023.01)

(52) U.S. Cl.
CPC .............. *G06N 7/01* (2023.01); *G06F 17/11* (2013.01); *G06Q 10/00* (2013.01)

(58) Field of Classification Search
CPC .......... G06F 11/30; G06F 17/11; G06F 16/11; G06N 7/005; G06Q 10/00; G05B 19/058; G05B 2219/14006
See application file for complete search history.

(56) References Cited

U.S. PATENT DOCUMENTS 7,457,550 B2 * 11/2008 Shoji .................. H04N 1/00074
399/9
7,554,574 B2 * 6/2009 Shoji ..................... G06F 3/1284
399/9
(Continued)

FOREIGN PATENT DOCUMENTS

CN 104919384 A 9/2015
CN 105527971 A 4/2016
(Continued)

OTHER PUBLICATIONS

Bansal, Dheeraj et al.; A real-time predictive maintenance system for machine systems; 2004 ELSEVIER; International Journal of Machine Tools & Manufacture 44 (2004) 759-766. (Year: 2004).*
(Continued)

*Primary Examiner* — Kuen S Lu
(74) *Attorney, Agent, or Firm* — Patterson + Sheridan, LLP

(57) ABSTRACT

A method, system, and computer program product for predicting abnormal operation of at least one component of a machine is provided. Real time monitoring data from an operating machine is received and monitoring features that are informative of likely abnormal operation are extracted and/or calculated. The monitoring features are applied to a prediction matrix that outputs probabilities of abnormal operation within one or more prediction time horizons. If the output probabilities exceed a threshold probability, then an alert can be output. Maintenance can be automatically scheduled in response to the alert.

18 Claims, 8 Drawing Sheets

(56) References Cited

U.S. PATENT DOCUMENTS

| | | | |
|---|---|---|---|
| 2002/0107452 A1* | 8/2002 | Kwong | G16H 40/67 600/509 |
| 2006/0146973 A1 | 7/2006 | Yeager et al. | |
| 2006/0259271 A1* | 11/2006 | House | G05B 23/0248 702/181 |
| 2012/0245760 A1* | 9/2012 | Ikeya | B60R 1/00 701/1 |
| 2013/0204808 A1 | 8/2013 | Jiang et al. | |
| 2015/0073759 A1 | 3/2015 | Vepakomma et al. | |
| 2016/0350671 A1* | 12/2016 | Morris, II | G05B 23/0229 |
| 2017/0344897 A1 | 11/2017 | Alam et al. | |
| 2017/0351966 A1* | 12/2017 | Rastogi | G01M 99/00 |
| 2019/0041839 A1* | 2/2019 | Zhang | G05B 23/0262 |

FOREIGN PATENT DOCUMENTS

| | | | |
|---|---|---|---|
| CN | 105593864 A | 5/2016 | |
| EP | 3009906 A1 | 4/2016 | |

OTHER PUBLICATIONS

Chinese Office Action for Application No. 2017036135.6 dated Mar. 3, 2021.

National Intellectual Property Administration, Notification of Second Office Action for Chinese Application 2017103621356 dated Sep. 3, 2021.

National Intellectual Property Administration, PRC, Decision of Rejection for Application 201710362135.6 dated Feb. 24, 2022.

https://en.wikipedia.org/wiki/Auxiliary_power_unit.

https://en.wikipedia.org/wiki/Thermodynamic_equations.

He, Song et al.: "inclusion of Sliding Friction in Contact Dynamics Model for Helical Gears", Journal of Mechanical Design, vol. 129, issue 1, Research Paper http://mechanicaldesign.asmedigitalcollection.asme.org/article.aspx?articleid=1449220#ShaftandBearingModels.

Extended European Search Report, dated May 22, 2017 for Application No. 17160229.5-1958.

European Examination Report For Application No. 17 160 229.5-1222 dated Mar. 20, 2019.

* cited by examiner

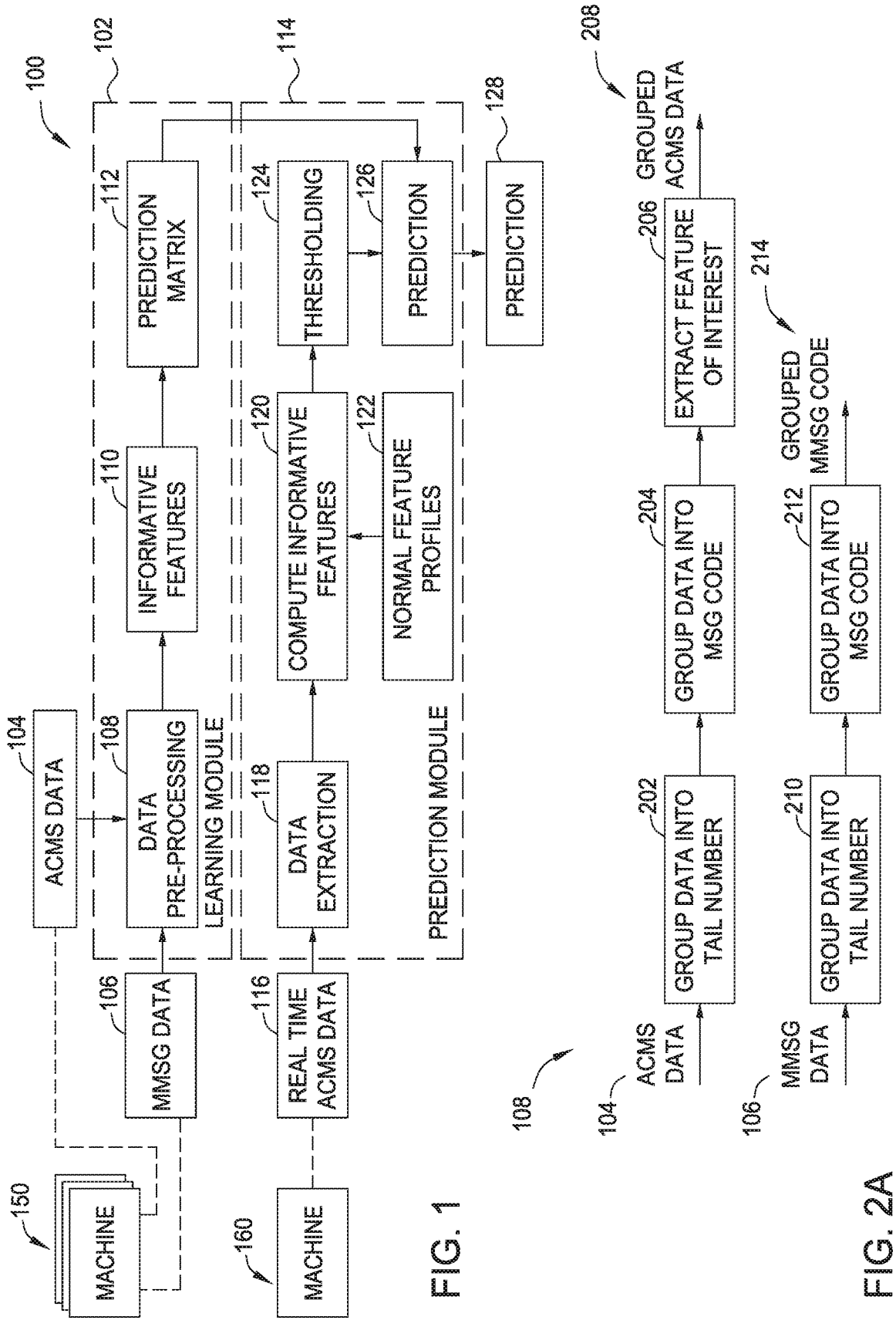

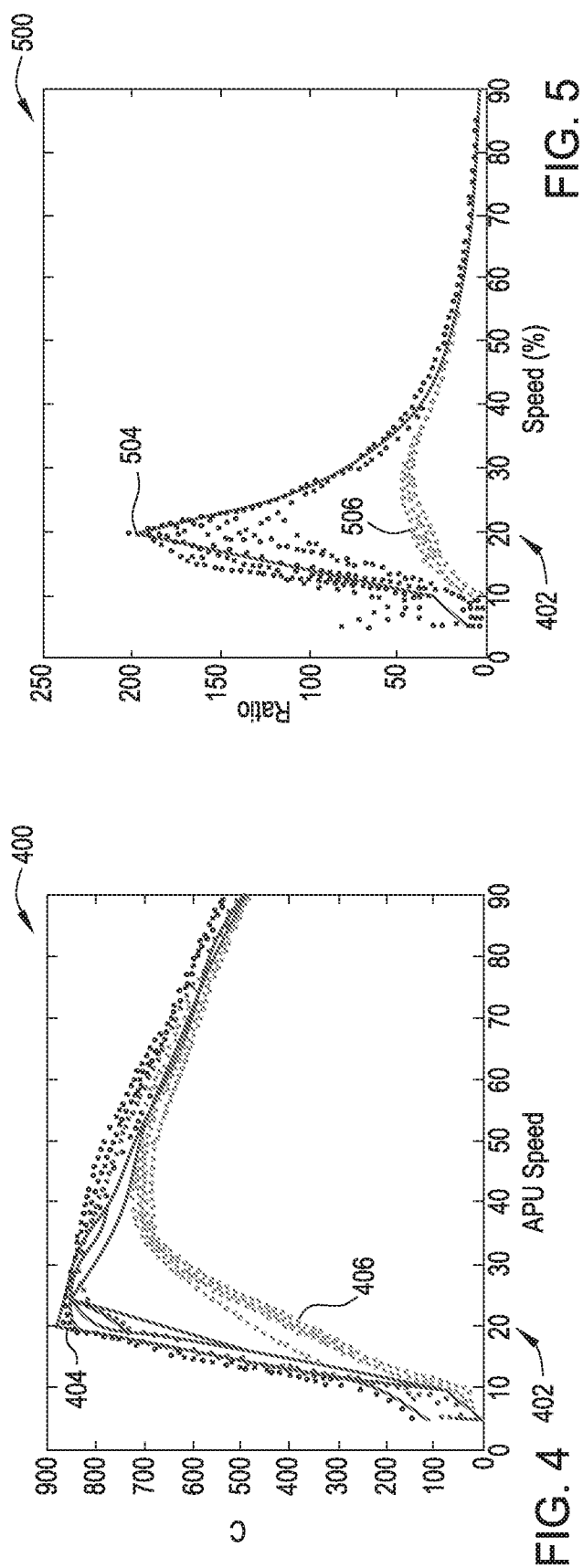
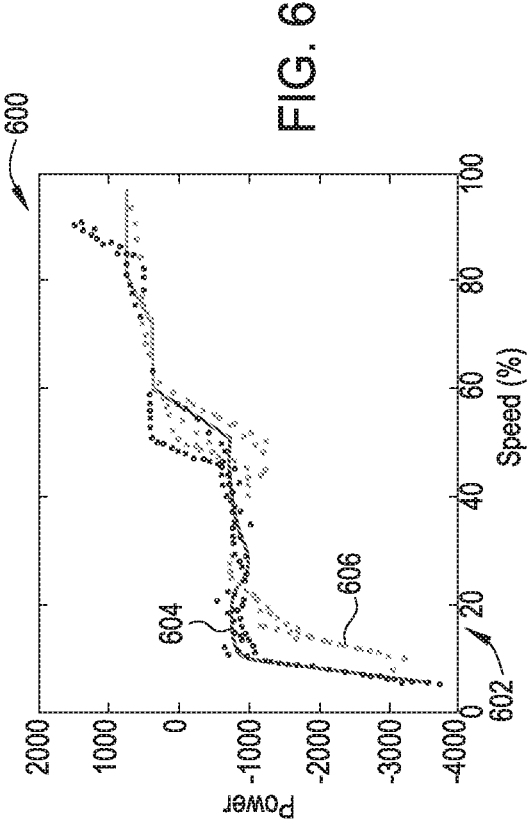

| THRESHOLD REGION | 2 WEEKS | 3 WEEKS | 4 WEEKS |
|---|---|---|---|
| [0.8, 1.03) | 0.38 | 0.54 | 0.87 |
| [1.03, 1.26) | 0.13 | 0.21 | 0.38 |
| [1.26, 1.5] | 0.14 | 0.25 | 0.43 |

| THRESHOLD REGION | 2 WEEKS | 3 WEEKS | 4 WEEKS |
|---|---|---|---|
| [1.8, 2.33) | 0.0 | 0.05 | 0.13 |
| [2.33, 2.86) | 0.27 | 0.42 | 0.60 |
| [2.86, 3.4] | 0.19 | 0.29 | 0.40 |

| THRESHOLD REGION | 2 WEEKS | 3 WEEKS | 4 WEEKS |
|---|---|---|---|
| [2.5, 2.9) | 0.07 | 0.07 | 0.07 |
| [2.9, 3.3) | 0.24 | 0.33 | 0.64 |
| [3.3, 3.8] | 0.16 | 0.24 | 0.30 |

FIG. 7

MONITORED MACHINE PERFORMANCE AS A MAINTENANCE PREDICTOR

CROSS-REFERENCE TO RELATED APPLICATIONS

This application is a continuation of co-pending U.S. Pat. No. 10,558,929, filed on May 31, 2016, which is hereby incorporated by reference in its entirety.

BACKGROUND

Development of prognostic and health management systems that can predict abnormal operations of commercial aircraft components is important for aircraft health management due to the complexity of modern aircraft.

SUMMARY

According to one aspect, a computer-implemented method of predicting component abnormal operation in a machine includes receiving monitoring data from the machine during operation of the machine. The method also includes computing at least one monitoring feature from the received monitoring data. The method also includes extracting a probability of a component operating abnormally from a prediction matrix based on the computed at least one monitoring feature. The method also includes scheduling maintenance for the component of the machine upon the extracted probability exceeding a first threshold value.

According to one aspect, a system includes a computer processor and a computer memory. The computer memory stores a prediction matrix for abnormal operation of a component of a machine. The computer memory also stores an abnormal operation prediction application. The abnormal operation prediction application is executable by the computer processor to receive monitoring data from the machine during operation of the machine. The abnormal operation prediction application is also executable to compute at least one monitoring feature from the received monitoring data. The abnormal operation prediction application is also executable to extract a probability of a component operating abnormally from the prediction matrix based on the computed at least one monitoring feature. The abnormal operation prediction application is also executable to schedule maintenance for the component of the machine upon the extracted probability exceeding a first threshold value.

According to one aspect, a computer program product for calculating a predicted abnormal operation of a machine includes a computer-readable storage medium having computer-readable program code embodied therewith. The computer-readable program code is executable by one or more computer processors to receive monitoring data from the machine during operation of the machine. The computer-readable program code is also executable to compute at least one monitoring feature from the received monitoring data. The computer-readable program code is also executable to extract a probability of a component operating abnormally from a prediction matrix based on the computed at least one monitoring feature. The computer-readable program code is also executable to schedule maintenance for the component of the machine upon the extracted probability exceeding a first threshold value.

BRIEF DESCRIPTION OF THE DRAWINGS

FIG. 1 is block diagram for a system, according to one aspect, for predicting abnormal operation of a machine;

FIG. 2A is a flow chart for a method, according to one aspect, for extracting historical data from an auxiliary power unit (APU) of an aircraft;

FIG. 4 is a chart illustrating exemplary data for a first monitoring feature from an APU and showing values of the first monitoring feature for a period before abnormal operation of the APU and after the cause of the abnormal operation has been remedied;

FIG. 5 is a chart illustrating exemplary data for a second monitoring feature from an APU and showing values of the second monitoring feature for a period before abnormal operation of the APU and after the cause of the abnormal operation has been remedied;

FIG. 6 is a chart illustrating exemplary data for a third monitoring feature from an APU and showing values of the third monitoring feature for a period before abnormal operation of the APU and after the cause of the abnormal operation has been remedied;

FIG. 7 is a block diagram illustrating at least a portion of an exemplary prediction matrix, according to at least one aspect;

DETAILED DESCRIPTION

Figure 2B:
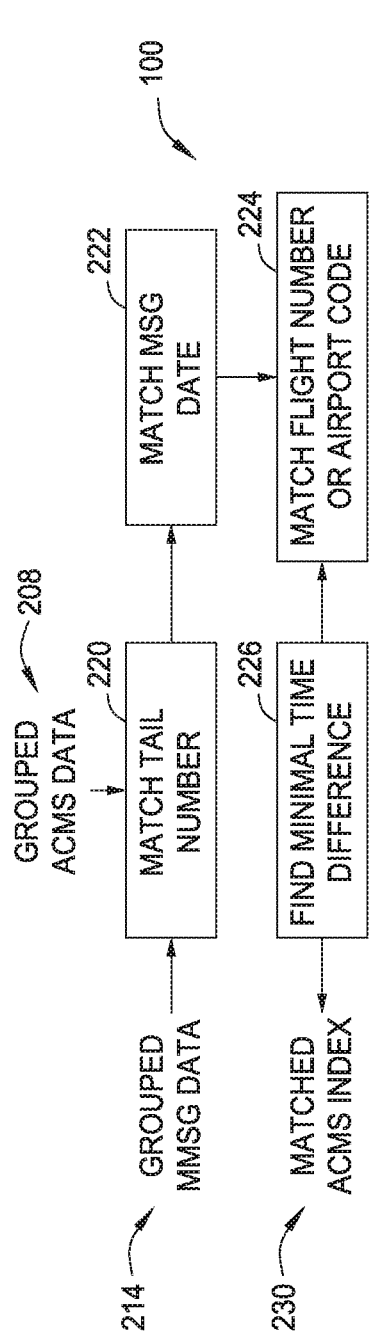
FIG. 2B is a flow chart for a method, according to one aspect, for matching abnormal operation indications in the historical data from FIG. 2A with monitoring data in the historical data from FIG. 2A.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

In aspects described herein, a system that is able to predict auxiliary power unit (APU) component abnormal operations of commercial aircraft is provided. In the system, aircraft condition monitoring system (ACMS) data and maintenance message (MMSG) data are used to compute a set of monitoring features. The monitoring features are used to monitor the operating status of and to predict the abnormal operations of APU components. The values of the monitoring features are compared to values in a prediction matrix to predict APU component abnormal operations. The prediction matrix contains a set of monitoring feature value regions, prediction time horizons or periods, and prediction probabilities corresponding to each monitoring feature value region and each prediction period. The prediction matrix is computed from APU history data. A prediction is conducted by comparing computed APU monitoring features with the prediction matrix (a look-up table method).

FIG. 1 presents a system diagram for an abnormal operation prediction system 100 according to one aspect. The abnormal operation prediction system 100 includes two parts: a learning module 102 and a prediction module 114. In the learning module 102, historical monitoring data 104 (e.g., ACMS data) and MMSG data 106 are received by a data pre-processing module 108 from various machines 150 and 160. The machines 150 and 160 could be a particular type of machine (e.g., identical machines that are a particular APU model) or a particular class of machine (e.g., similar machines that are all APUs of a particular design). The data pre-processing module 108 aligns the Historical monitoring data 104 with the MMSG data 106 such that events recorded in the Historical monitoring data 104 line up with events recorded in the MMSG data 106. The learning module 102 also includes an informative features module 110 that identifies monitoring features in the Historical monitoring data 104 and/or MMSG data 106 that is predictive of abnormal operation. The learning module 102 also includes a prediction matrix module 112 that computes the prediction matrix that contains monitoring feature value regions, prediction time horizons, and prediction probabilities (confidence). The prediction matrix module 112 can periodically re-compute the prediction matrix as new MMSG data 106 and new Historical monitoring data 104 becomes available.

In the prediction module 114, a data extraction module 118 receives real-time monitoring data 116 (e.g., real-time ACMS data) from a particular one of the machines 160. A compute informative features module 120 computes values for informative features based on the monitoring features identified by the informative features module 110. In various aspects, the computed values of the monitoring features can be normalized (e.g., based on an age of the APU) by a normal feature profiles module 122. A thresholding module 124 determines a monitoring feature value region of the prediction matrix to be used, and a prediction module 126 performs a look-up operation in the prediction matrix to determine a probability of abnormal operation. The prediction module 114 outputs the abnormal operation probability.

The purpose of the learning module 102 of the system is to find informative monitoring features from one or more sources 106 that can be used as abnormal operation indicators for a given component of the aircraft APU. Since component abnormal operation information is recorded in maintenance message (MMSG) data 106, the learning module 102 uses both Historical monitoring data 104 and MMSG data 106 to learn informative monitoring features. The learning module 102 includes a data pre-processing module 108, an informative features module 110, and a prediction matrix module 112.

With reference to FIG. 2, the data pre-processing module 108 of the learning module 102 aligns the Historical monitoring data 104 and the MMSG data 106. The Historical monitoring data 104 and the MMSG data 106 have specific data formats that are not designed for numerical analysis. Both the Historical monitoring data 104 and the MMSG data 106 may include text, symbolic values, and/or numeric parameters, for example. Therefore, data preprocessing is used to extract relevant data from the Historical monitoring data 104 and the MMSG data 106 before applying data analysis techniques. To perform the data analysis in the informative feature module 110, two types of data are used: data collected before a component abnormal operation occurs, which provides condition changing information of a targeted component/system, and data collected after the component abnormal operation is fixed, which provides the normal condition information of the targeted component/system. In various aspects, the time span prior to component abnormal operation for which data is collected can vary. Such a time span could be set according to operator policy (e.g., two weeks, three weeks, four weeks, two months, or three months). Such a time span could also be set and/or modified according to historical data. For example, if the Historical monitoring data 104 historically begins to change three weeks prior to an abnormal operation, then the time span could be set to four weeks to capture the three weeks of data and additional data as a buffer. The information of an operating condition of a component is contained in the Historical monitoring data 104 and the information of the component abnormal operation is contained in MMSG data 106. Therefore, the Historical monitoring data 104 is first aligned with the MMSG data 106 to obtain the two types of information for the data analysis. The data pre-processing module 108 performs two functions: extracting relevant data from the Historical monitoring data 104 and the MMSG data 106, and aligning the Historical monitoring data 104 with the MMSG data 106. FIG. 2A illustrates a flow chart for a process for extracting relevant data from the Historical monitoring data 104 and the MMSG data 106, and FIG. 2B illustrates a flow chart for a process of matching the Historical monitoring data 104 with the MMSG data 106.

Referring to FIG. 2A, to extract relevant Historical monitoring data 104, raw ACMS data is grouped by tail number in block 202 and then grouped by abnormal operation message code in block 204. For a given APU component, relevant features are extracted from the raw ACMS data in block 206 and output as grouped ACMS data 208. Similarly, raw MMSG data is grouped by tail number in block 210 and then by abnormal operation message code in block 212, and then output as grouped MMSG data 214. Referring to FIG. 2B, the grouped ACMS data 208 and the grouped MMSG data 214 are matched by the data alignment process. The ACMS data 208 and the MMSG data 214 are matched by tail number in block 220, by MMSG date code in block 222, and by flight number and airport code in block 224. The ACMS data 208 and MMSG data 214 are then matched by minimal time difference in block 226 to output matched ACMS data 230. The matched ACMS data 230 includes ACMS monitoring features for before and after an APU component abnormal operation.

Figure 3:
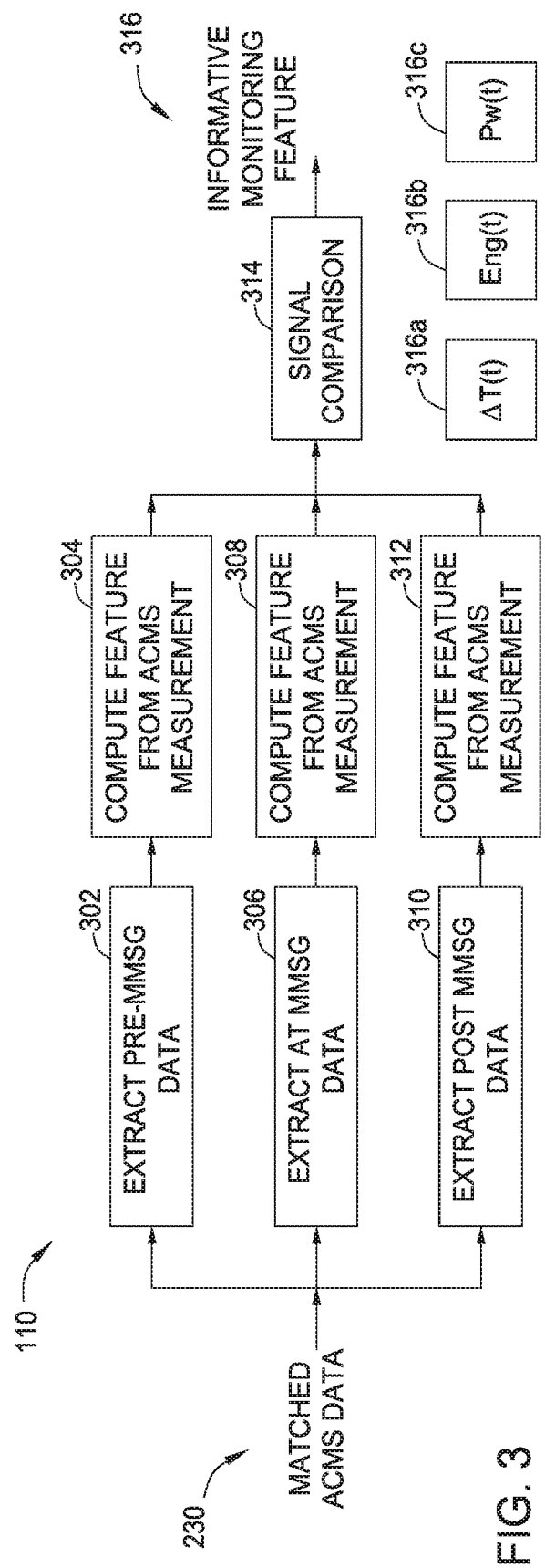
FIG. 3 is a flow chart for a method, according to one aspect, for determining informative monitoring features, based on the historical data from FIG. 2A.

FIG. 3 is a flow chart illustrating a learning process according to one aspect for the informative features module 110 shown in FIG. 1. Learning informative monitoring features for abnormal operation of a given APU component is an important task for predicting abnormal operation. In various circumstances, the APU includes nineteen measurements in ACMS data. For a given MMSG code, not every APU measurement in the Historical monitoring data 104 informs abnormal operation prediction. The informative features module 110 compares two segments of matched ACMS data 230 to find informative features. One data segment is obtained from an abnormal operation date up to one month before the abnormal operation date, and is referred to as pre-MMSG data 302. The other data segment is from five to eight weeks after the abnormal operation date, and is referred to as post-MMSG data 310. A computed value of the monitoring feature (in block 304) of the pre-MMSG data 302 of the first data segment represents abnormal operating conditions and a computed value of the monitoring feature (in block 312) of the post-MMSG data 310 of the second data segment represents normal operating conditions for a given APU MMSG code. For a given MMSG code, during a signal comparison process 314 if a feature signal shows a big difference between its pre-MMSG data 302 and its post-MMSG data 310, the feature is an informative monitoring feature 316 because the feature presents the difference between normal operating conditions and abnormal operating conditions. In various aspects, a data segment is obtained immediately prior to the abnormal operation, and is referred to as at-abnormal-operation MMSG data 306. A computed value of the monitoring feature (in block 308) of the at-abnormal-operation MMSG data 306 could represent operating conditions immediately prior to abnormal operations. Three exemplary monitoring features 316a, 316b, and 316c are described in greater detail in the subsequent paragraphs and in FIGS. 4-6.

Different MMSG codes for an APU may have different informative monitoring features. For illustration purposes, consider an MMSG code related to brush wear on an electric starter motor for the APU. Such an abnormal operation (brush wear on an electric starter motor) could be informed by one or more of three exemplary monitoring features. A first monitoring feature 316a is an engine temperature differential, defined by Equation (1):

$$\Delta T(t) = T6(t) - T2(t); \tag{1}$$

where T6(t) is the measured temperature of the APU engine exhaust and T2(t) is the measured temperature of the APU engine inlet. FIG. 4 shows an exemplary plot 400 of the ΔT(t) monitoring feature 316a defined by Equation (1) at various engine speeds. At 20% of a maximum APU speed 402, the values of the ΔT(t) monitoring feature 316a for pre-MMSG data 404 are significantly higher than for post-MMSG data 406.

A second monitoring feature 316b is an energy ratio, defined by Equation (2):

$$Eng(t) = \frac{\Delta T(t)^2}{\Delta \theta(t)^2}; \tag{2}$$

where ΔT(t) is defined by Equation (1), above, Δθ(t) is a measurement of APU angular speed. ΔT(t)² is proportional to the chemical energy in the system and Δθ(t)² is proportional to the mechanical energy in the system. Thus, the energy ratio monitoring feature 316b provided by Equation (2) represents the efficiency of energy conversion within the system. The system efficiency can change when a component of the APU is experiencing abnormal operation. FIG. 5 shows an exemplary plot 500 of the energy ratio Eng(t) monitoring feature 316b at various engine speeds. At 20% of a maximum APU speed 402, the values of the Eng(t) monitoring feature 316b for pre-MMSG data 504 are significantly higher than for post-MMSG data 506.

A third monitoring feature 316c is an electric power value, defined by Equation (3):

$$Pw(t) = I(t) \times V(t); \tag{3}$$

where I(t) is measured APU current output by the electric starter motor (the starter motor also acts as a generator after APU start) and V(t) is measured APU voltage output by the electric starter motor. The electric power Pw(t) monitoring feature 316c provided by Equation (3) represents the power consumption of the APU. The electric power Pw(t) monitoring feature is expected to be different when the electric starter motor is experiencing abnormal operation. FIG. 6 shows an exemplary plot 600 of the electric power Pw(t) monitoring feature 316c at various engine speeds. At 15% of a maximum APU speed 602, the values of the Pw(t) monitoring feature 316c for pre-MMSG data 604 are significantly different from the values for the post-MMSG data 606.

The above-discussed monitoring features are exemplary of monitoring features 316 that may be informative for predicting abnormal operations of an electric starter motor that has significant brush wear. Other monitoring features 316 could also be informative for predicting the same or different abnormal operations of an electric starter motor. Other monitoring features would be informative for predicting abnormal operations of other components of the APU. For example, various pressures, pressure ratios, pressure differences, temperatures, temperature ratios, and/or temperature differences could be informative for various abnormal operations of certain components. In addition, the various monitoring features 316 could be most informative at certain operating conditions. For example, a monitoring feature 316 that defines a pressure across a valve in a duct may be most informative in a range of engine speeds or other operating condition of the APU at which the valve opens or closes.

In various aspects, the values of the monitored features are normalized to account for an amount of use of the APU. As FIGS. 4-6 demonstrate, the values of the informative monitoring features can change as the APU is used and approaches a life cycle limit (at which time components of the APU are replaced, repaired, and/or refurbished). Normalizing the monitoring features can remove or reduce any dependence of the values of the monitoring features on the life cycle of the APU. For example, the ΔT(t) monitoring feature defined by Equation (1) can be normalized according to Equation (4):

$$ft_{tmp} = \beta \exp[-\alpha \cdot r(t)] \frac{\Delta T(t) - \Delta T_{norm}}{\Delta T_{norm}}; \tag{4}$$

$$\text{where } r(t) = \frac{c(t)}{LC},$$

c(t) is a measurement of the usage of the APU at time t, and LC is the usage limit of the APU; $\Delta T_{norm}$ is the temperature monitoring feature computed from the post-MMSG data (e.g., post-MMSG data 310), which is the normal profile of the temperature monitoring feature; β is equal to 5.0; and α varies depending on the value of c(t). For example, in one aspect, α is equal to 0.5 if c(t) is less than or equal to one third of the usage limit LC; α is equal to 3.0 if c(t) is greater than one third of LC and less than two thirds of LC; and α is equal to 1.5 if c(t) is greater than or equal to two thirds of LC. For example, if the APU usage limit is five thousand hours and a particular APU has one thousand hours, then c(t) is equal to one fifth of LC, and the value of α is 0.5. As another example, if the APU usage limit is four thousand cycles (i.e., turned on and off) and a particular APU has two thousand cycles, then c(t) is equal to one half of LC, and the value of α is 3.0. In various aspects, the normalized temperature monitoring feature $ft_{tmp}$ can be calculated based on values of the ΔT(t) monitoring feature and $\Delta T_{norm}$ that are determined at a particular engine speed, such as 20% of the maximum operating speed of the APU.

As another example, the energy ratio Eng(t) monitoring feature defined by Equation (2) can be normalized according to Equation (5):

$$ft_{eng} = \beta \exp[-\alpha \cdot r(t)] \frac{Eng(t) - Eng_{norm}}{Eng_{norm}}; \qquad (5)$$

where $Eng_{norm}$ is the energy ratio from the post-MMSG data; $\beta$ is equal to 5.0; and $\alpha$ varies depending on the value of c(t). For example, in one aspect, $\alpha$ is equal to 0.05 if c(t) is less than or equal to one third of the usage limit LC; $\alpha$ is equal to 3.5 if c(t) is greater than one third of LC and less than two thirds of LC; and a is equal to 1.5 if c(t) is greater than or equal to two thirds of LC. In various aspects, the normalized temperature monitoring feature $ft_{eng}$ can be calculated based on values of the energy ratio Eng(t) monitoring feature and $Eng_{norm}$ that are determined at a particular engine speed, such as 20% of the maximum operating speed of the APU.

As another example, the electric power Pw(t) monitoring feature defined by Equation (3) can be normalized according to Equation (6):

$$ft_{pw} = \beta \exp[-\alpha \cdot r(t)] \frac{Pw(t) - Pw_{norm}}{Pw_{norm}}; \qquad (6)$$

wherein $Pw_{norm}$ is the electric power from the post-MMSG data; $\beta$ is equal to 5.0; and $\alpha$ varies depending on the value of c(t). For example, in one aspect, $\alpha$ is equal to 7.0 if c(t) is less than or equal to one third of the usage limit LC; $\alpha$ is equal to 2.0 if c(t) is greater than one third of LC and less than two thirds of LC; and $\alpha$ is equal to 1.5 if c(t) is greater than or equal to two thirds of LC. In various aspects, the normalized electric power monitoring feature $ft_{pw}$ can be calculated based on values of the electric power Pw(t) monitoring feature and $Pw_{norm}$ that are determined at a particular engine speed, such as 15% of the maximum operating speed of the APU.

In one aspect, the values of $\alpha$ and $\beta$ can be determined experimentally. For example, the values of $\alpha$ and $\beta$ for the different normalized monitoring features can be determined by fitting the selecting values that result in the values of the normalized monitoring features being essentially constant regardless of the life cycle of a particular APU. In one aspect, the value of $\beta$ is adjusted to scale the value of a particular normalized feature to be in a desired dynamic range. In various aspects, the value $\beta$ may be omitted (or set to a value of one) from the equation for a particular normalized feature if the resulting values of the normalized feature are in the desired dynamic range. As discussed above, the value of the features changes over time as the usage c(t) of the APU increases. The values of $\alpha$ can be adjusted for different ranges of APU usage c(t) to keep the value of the normalized feature in the desired dynamic range. In one aspect, the values of $\alpha$ can be determined by first examining historical data to compute variations of the value of the feature for the different usage periods of c(t). Thereafter, values of $\alpha$ can be set that make the range of values for the normalized feature for the respective usage periods of c(t) fall within (or mostly fall within) the desired dynamic range.

The monitoring features or the normalized monitoring features can be used to build a prediction matrix. Before using the monitoring features in the prediction matrix, threshold regions are first determined (e.g., by the thresholding module 124). In one aspect, threshold regions are determined for a particular normalized feature by finding a maximum value and a minimum value over all of the abnormal operation data in the historical data. A range of values between the maximum and minimum value is then divided into several sub-regions. For example, the range of values could be divided into three or four sub-regions. In various aspects, the sub-regions have equal or nearly-equal ranges of values. In various other aspects, the sub-regions could be divided in another manner. For example, the sub-regions could be divided such that an equal or nearly equal number of abnormal operation instances therein. The boundary values of the sub-regions define the threshold values of the sub-regions.

FIG. 7 illustrates an exemplary prediction matrix 700 for the above-discussed electric starter motor brush wear abnormal operation that includes three exemplary prediction sub-matrices: a first prediction sub-matrix 702 based on the normalized temperature monitoring feature $ft_{tmp}$, a second prediction sub-matrix 720 based on the normalized energy ratio monitoring feature $ft_{eng}$, and a third prediction sub-matrix 730 based on the normalized electric power monitoring feature $ft_{pw}$. With respect to the first exemplary prediction sub-matrix 702, a first column 704 of the first prediction sub-matrix 702 includes values for the normalized temperature monitoring feature $ft_{tmp}$ that are divided into three sub-regions. A first sub-region is arranged in a first row 712 of the first prediction sub-matrix 702 and includes values of the normalized temperature monitoring feature $ft_{tmp}$ from a minimum value of 0.8 to values less than 1.03. A second sub-region is arranged in a second row 714 of the first prediction sub-matrix 702 and includes values of the normalized temperature monitoring feature $ft_{tmp}$ greater than or equal to 1.03 to values less than 1.26. A third sub-region is arranged in a third row 716 of the first prediction sub-matrix 702 and includes values of the normalized temperature monitoring feature $ft_{tmp}$ greater than or equal to 1.26 to a maximum value of 1.5.

With respect to the second exemplary prediction sub-matrix 720, a first column 722 of the second prediction sub-matrix 720 includes values for the normalized energy ratio monitoring feature $ft_{eng}$ that are divided into three sub-regions. A first sub-region is arranged in a first row 724 of the second prediction sub-matrix 720 and includes values of the normalized energy ratio monitoring feature $ft_{eng}$ from a minimum value of 1.8 to values less than 2.33. A second sub-region is arranged in a second row 726 of the second prediction sub-matrix 720 and includes values of the normalized energy ratio monitoring feature $ft_{eng}$ greater than or equal to 2.33 to values less than 2.86. A third sub-region is arranged in a third row 728 of the second prediction sub-matrix 720 and includes values of the normalized temperature monitoring feature $ft_{eng}$ greater than or equal to 2.86 to a maximum value of 3.4.

With respect to the third exemplary prediction sub-matrix 730, a first column 732 of the third prediction sub-matrix 730 includes values for the normalized electric power monitoring feature $ft_{pw}$ that are divided into three sub-regions. A first sub-region is arranged in a first row 734 of the third prediction sub-matrix 730 and includes values of the normalized electric power monitoring feature $ft_{pw}$ from a minimum value of 2.5 to values less than 2.9. A second sub-region is arranged in a second row 736 of the third prediction sub-matrix 730 and includes values of the normalized electric power monitoring feature $ft_{pw}$ greater than or equal to 2.9 to values less than 3.3. A third sub-region is arranged in a third row 738 of the third prediction sub-matrix 730 and includes values of the normalized electric power monitoring feature $ft_{pw}$ greater than or equal to 3.3 to a maximum value of 3.8.

The prediction sub-matrices 702, 720, and 730 include columns for different prediction time horizons. In the exemplary prediction matrix 700, the three sub-matrices 702, 720, and 730 include three columns for the same three prediction time horizons: a second column 706 for a two-week prediction time horizon, a third column 708 for a three-week prediction time horizon, and a fourth column 710 for a four-week prediction time horizon. The values in the various prediction time horizon columns indicate a probability that a particular APU will experience abnormal operations within the time horizon for a given value of a normalized monitoring feature. For example, if a real-time value of the normalized temperature monitoring feature $ft_{tmp}$ for an APU is equal to 0.9, then the first row 712 of the first prediction sub-matrix 702 is used. Accordingly, the first prediction sub-matrix indicates that the probability of the APU experiencing abnormal operations due to electric starter motor brush wear in the next two weeks is equal to 0.38 or 38%. The first prediction sub-matrix indicates that the probability of the APU experiencing abnormal operations due to electric starter motor brush wear in the next three weeks is equal to 0.54 or 54%. The first prediction sub-matrix indicates that the probability of the APU experiencing abnormal operations due to electric starter motor brush wear in the next four weeks is equal to 0.87 or 87%.

As another example, if a real-time value of the normalized temperature monitoring feature $ft_{tmp}$ for an APU is equal to 1.1, then the second row 714 of the first prediction sub-matrix 702 is used. Accordingly, the first prediction sub-matrix indicates that the probability of the APU experiencing abnormal operations due to electric starter motor brush wear in the next two weeks is equal to 0.13 or 13%. The first prediction sub-matrix indicates that the probability of the APU experiencing abnormal operations due to electric starter motor brush wear in the next three weeks is equal to 0.21 or 21%. The first prediction sub-matrix indicates that the probability of the APU experiencing abnormal operations due to electric starter motor brush wear in the next four weeks is equal to 0.38 or 38%.

As another example, if a real-time value of the normalized temperature monitoring feature $ft_{tmp}$ for an APU is equal to 1.45, then the third row 716 of the first prediction sub-matrix 702 is used. Accordingly, the first prediction sub-matrix indicates that the probability of the APU experiencing abnormal operations due to electric starter motor brush wear in the next two weeks is equal to 0.14 or 14%. The first prediction sub-matrix indicates that the probability of the APU experiencing abnormal operations due to electric starter motor brush wear in the next three weeks is equal to 0.25 or 25%. The first prediction sub-matrix indicates that the probability of the APU experiencing abnormal operations due to electric starter motor brush wear in the next four weeks is equal to 0.43 or 43%.

Probabilities based on the prediction time horizons for the normalized energy ratio monitoring feature $ft_{eng}$ in the second prediction sub-matrix 720 and for the normalized electric power monitoring feature $ft_{pw}$ in the third prediction sub-matrix 730 can be determined in a similar manner.

To determine the probabilities at the different prediction time horizons for the sub-matrices, the calculated normalized monitoring features for the historical data (e.g., the pre-MMSG data 302 and the post-MMSG data 310) are analyzed to determine the number of instances out of the total number of stored in which a component of the APU experienced abnormal operation within a particular time horizon when a normalized monitoring feature was within a particular sub-region of values. For example, with reference to the first prediction sub-matrix 702, the historical data may include one hundred instances of abnormal operation of an electric starter motor due to brush wear. As an illustrative example, if the abnormal operation occurred in thirty eight of the one hundred instances within two weeks of the values of the normalized temperature monitoring feature $ft_{tmp}$ being in the first sub-region between a value equal to 0.8 and a value less than 1.03 (row 712), then the probability of an abnormal operation in a two-week time horizon (column 706) is the 0.38 or 38% indicated in the first prediction sub-matrix 702. As another illustrative example, if the abnormal operation occurred in fifty four of the one hundred instances within three weeks of the values of the normalized temperature monitoring feature $ft_{tmp}$ being in the first sub-region between a value equal to 0.8 and a value less than 1.03 (row 712), then the probability of an abnormal operation in a three-week time horizon (column 708) is the 0.54 or 54% indicated in the first prediction sub-matrix 702. As yet another illustrative example, if the abnormal operation occurred in eighty seven of the one hundred instances within four weeks of the values of the normalized temperature monitoring feature $ft_{tmp}$ being in the first sub-region between a value equal to 0.8 and a value less than 1.03 (row 712), then the probability of an abnormal operation in a four-week time horizon (column 710) is the 0.87 or 87% indicated in the first prediction sub-matrix 702.

The probabilities for the remaining rows of the first prediction sub-matrix 702 can be determined in a similar manner. As an illustrative example, if the abnormal operation occurred in thirteen of the one hundred instances within two weeks of the values of the normalized temperature monitoring feature $ft_{tmp}$ being in the second sub-region between a value equal to 1.03 and a value less than 1.26 (row 714), then the probability of an abnormal operation in a two-week time horizon (column 706) is the 0.13 or 13% indicated in the first prediction sub-matrix 702. As another example, if the abnormal operation occurred in twenty one of the one hundred instances within three weeks of the values of the normalized temperature monitoring feature $ft_{tmp}$ being in the second sub-region between a value equal to 1.03 and a value less than 1.26 (row 714), then the probability of an abnormal operation in a three-week time horizon (column 708) is the 0.21 or 21% indicated in the first prediction sub-matrix 702. As another example, if the abnormal operation occurred in thirty eight of the one hundred instances within three weeks of the values of the normalized temperature monitoring feature $ft_{tmp}$ being in the second sub-region between a value equal to 1.03 and a value less than 1.26 (row 714), then the probability of an abnormal operation in a four-week time horizon (column 710) is the 0.38 or 38% indicated in the first prediction sub-matrix 702.

As another illustrative example, if the abnormal operation occurred in fourteen of the one hundred instances within two weeks of the values of the normalized temperature monitoring feature $ft_{tmp}$ being in the third sub-region between a value equal to 1.26 and a value equal to or less than 1.5 (row 716), then the probability of an abnormal operation in a two-week time horizon (column 706) is the 0.14 or 14% indicated in the first prediction sub-matrix 702. As yet another illustrative example, if the abnormal operation occurred in twenty five of the one hundred instances within three weeks of the values of the normalized temperature monitoring feature $ft_{tmp}$ being in the third sub-region between a value equal to 1.26 and a value equal to or less than 1.5 (row 716), then the probability of an abnormal operation in a three-week time horizon (column 708) is the 0.25 or 25% indicated in the first prediction sub-matrix 702. As yet another illustrative example, if the abnormal operation occurred in forty three of the one hundred instances within four weeks of the values of the normalized temperature monitoring feature $ft_{tmp}$ being in the third sub-region between a value equal to 1.26 and a value equal to or less than 1.5 (row 716), then the probability of an abnormal operation in a four-week time horizon (column 710) is the 0.43 or 43% indicated in the first prediction sub-matrix 702.

The probabilities for the different time horizons for the other prediction sub-matrices 720 and 730 can be determined in a similar manner as described above with reference to the first prediction sub-matrix 702. The three exemplary sub-matrices 702, 720, and 730 in the exemplary prediction matrix 700 use the same exemplary prediction time horizons of two weeks (column 706), three weeks (column 708), and four weeks (column 710). In various aspects, different prediction sub-matrices could have different prediction time horizons that are suitable for different circumstances.

The prediction matrix 700 can store prediction sub-matrices for various monitoring features that are informative of different modes of abnormal operation for the APU. For example, different modes of abnormal operation could include brush wear of an electric starter motor or sticking of a valve. The prediction matrix could include at least one prediction sub-matrix for each of the different modes of abnormal operation, wherein each of the at least one prediction sub-matrices is related to a particular normalized monitoring feature that is informative for the particular mode of abnormal operation.

After the prediction matrix 700 has been populated with the various prediction sub-matrices, the prediction matrix 700 can be used to predict abnormal operation of APU components in real time. Real-time or near-real-time ACMS data from an aircraft can be retrieved, and the monitoring features can be determined and normalized, as discussed above. In various aspects, the ACMS data could be averaged over a window of time to eliminate or reduce noise in the ACMS data. The normalized values of the monitoring features can be provided to the prediction matrix 700, and the prediction matrix 700 outputs one or more probabilities of abnormal operation. Where a value for a single normalized monitoring feature is provided to the prediction matrix, a single probability value (or set of probability values based on the different prediction time horizons) for a given abnormal operation is output. In aspects in which a plurality of values for respective normalized monitoring features are provided to the prediction matrix for predicting a particular abnormal operation, the probability values from the respective prediction sub-matrices can be statistically analyzed to output a probability for the abnormal operation. For example, an average of the probability values could be output, a maximum value (i.e., a maximum probability) could be output, or a minimum value (i.e., a minimum probability) could be output.

To illustrate such statistical analysis, the three prediction sub-matrices 702, 720, and 730 in FIG. 7 include probabilities for abnormal operation due to electric starter motor brush wear. Suppose that in a particular instance, the real-time or near-real-time ACMS data results in a value for the normalized temperature monitoring feature $ft_{tmp}$ of 0.9, a value for the normalized energy ratio monitoring feature $ft_{eng}$ of 2.45, and a value for the normalized electric power monitoring feature $ft_{pw}$ of 3.4. As discussed above, the first prediction sub-matrix 702 uses the normalized temperature monitoring feature $ft_{tmp}$, and the exemplary value of 0.9 relates to probabilities of abnormal operation of 38% within two weeks, 54% within three weeks, and 87% in three weeks (i.e., the first row 712 of the first prediction sub-matrix 702). The second prediction sub-matrix 720 uses the normalized energy ratio monitoring feature $ft_{eng}$, and the exemplary value of 2.45 relates to probabilities of abnormal operation of 27% within two weeks, 42% within three weeks, and 60% in three weeks (i.e., the second row 726 of the second prediction sub-matrix 720). The third prediction sub-matrix 730 uses the normalized electric power monitoring feature $ft_{pw}$, and the exemplary value of 3.4 relates to probabilities of abnormal operation of 16% within two weeks, 24% within three weeks, and 30% in three weeks (i.e., the third row 738 of the third prediction sub-matrix 730). As discussed above, in one aspect, a minimum probability value for each time horizon could be output as the probability of abnormal operation. Based on the above exemplary values for the normalized monitoring features, the minimum probabilities of abnormal operation would be 16% (from the third prediction sub-matrix 730) within two weeks, 21% (from the first prediction sub-matrix 702) within three weeks, and 30% (from the third prediction sub-matrix 730) within four weeks. In another aspect, a maximum probability value for each time horizon could be output as the probability of abnormal operation. Based on the above exemplary values for the normalized monitoring features, the maximum probabilities of abnormal operation would be 38% (from the first prediction sub-matrix 702) within two weeks, 54% (from the first prediction sub-matrix 702) within three weeks, and 87% (from the first prediction sub-matrix 702) within four weeks. In another aspect, an average probability value for each time horizon could be output as the probability of abnormal operation. Based on the above exemplary values for the normalized monitoring features, the maximum probabilities of abnormal operation would be 27% ((38%+27%+16%)/3) within two weeks, 40% ((54%+42%+24%)/3) within three weeks, and 59% ((87%+60%+30%)/3) within four weeks.

The probability of abnormal operation output by the prediction matrix 700 for a particular mode of abnormal operation can be compared to a threshold probability or array of probability thresholds. In at least one aspect, an array of thresholds could include different threshold values for the different prediction time horizons. For example, in one exemplary aspect, an array of threshold values include threshold values of 20% for a two-week prediction time horizon, 40% for a three-week prediction time horizon, and 60% for a four-week time horizon. In the event the probability of abnormal operation output by the prediction matrix 700 exceeds a threshold amount, then an alert can be generated. With reference to the exemplary array of threshold values, if the probability of a particular abnormal operation occurring within two weeks is greater than or equal to 20%, then an alert can be generated. Similarly, if the probability of a particular abnormal operation occurring within three weeks is greater than or equal to 40%, then an alert can be generated. Also, if the probability of a particular abnormal operation occurring within three weeks is greater than or equal to 60%, then an alert can be generated. In at least one aspect, maintenance to repair, replace, and/or refurbish the component(s) predicted to experience abnormal operation can be automatically scheduled in response to the alert.

Figure 8:
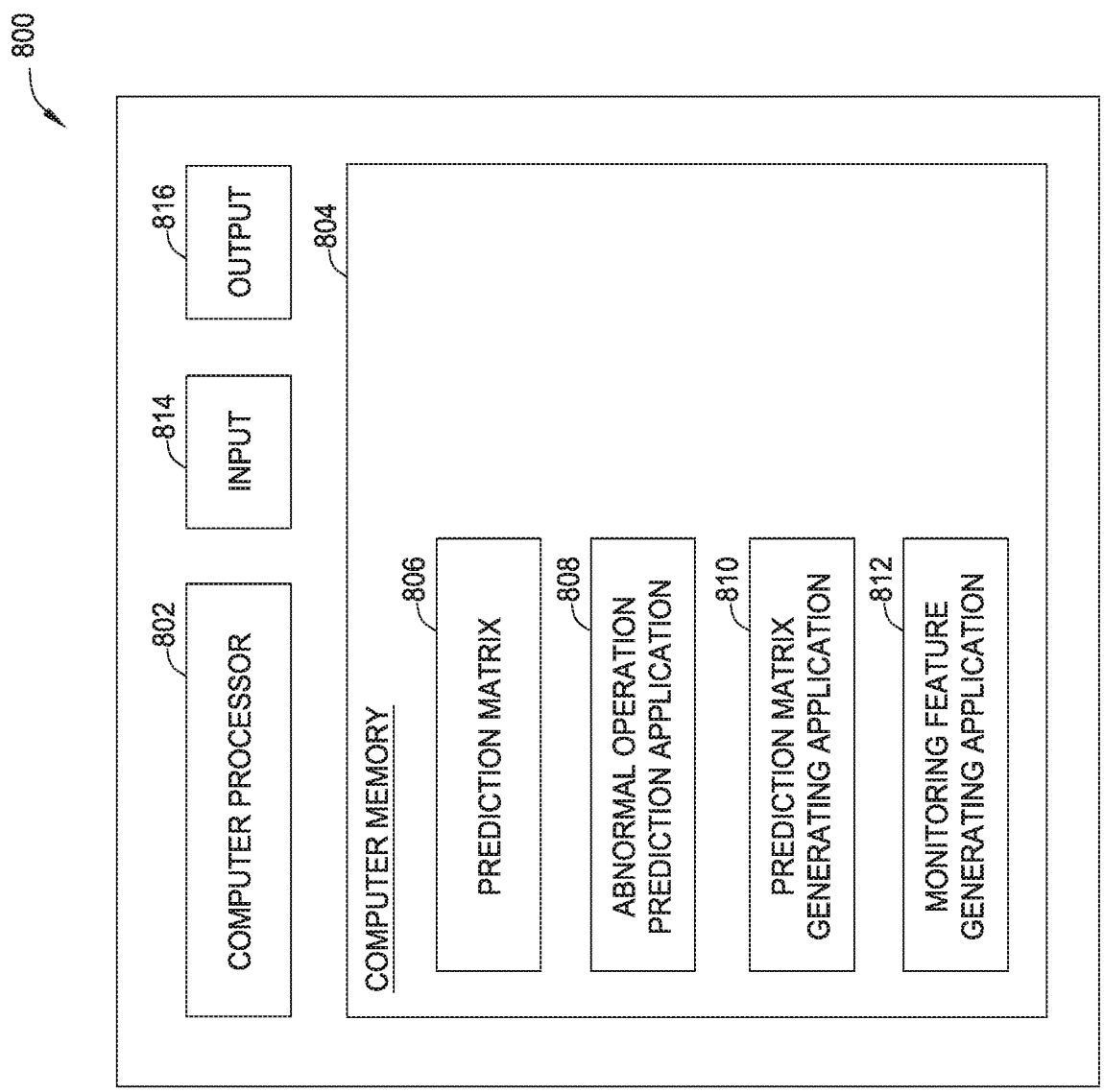
FIG. 8 is a block diagram of a system, according to one aspect, for predicting abnormal operation of a machine.

FIG. 8 illustrates a system 800 for predicting abnormal operation of an APU or a component of an APU according to one aspect. The system 800 includes a computer processor 802 and computer memory 804. The computer memory 804 stores a prediction matrix 806 (e.g., the exemplary prediction matrix 700 illustrated in FIG. 7). The computer memory 804 also includes an abnormal operation prediction application 808 that, when executed on the computer processor 802 determines a probability or probabilities of abnormal operation of the APU based on real-time or near-real-time ACMS data. The computer memory 804 also includes a prediction matrix generating application 810 that can generate the prediction matrix 806. The computer memory 804 also stores a monitoring feature generation application 812 that can generate and/or identify monitoring features that are informative of abnormal operations of the APU. The system 800 also includes an input 814 and an output 816. The input 814 can receive historical ACMS data (e.g., the Historical monitoring data 104 in FIG. 1) and historical MMSG data (e.g., the MMSG data 106 data in FIG. 1) for use by the prediction matrix generating application 810 to generate the prediction matrix 806 and for use by the monitoring feature generation application 812 to identify and/or generate monitoring features that are informative of abnormal operations of the APU. The input 814 can also receive real-time or near-real-time monitoring data (e.g., the real-time monitoring data 116 in FIG. 1) for use by the abnormal operation prediction application 808 to determine a real-time probability of abnormal operation of at least a component of the APU. The computer processor 802 can output alerts and/or a scheduled maintenance request via the output 816 upon a determined real-time probability exceeding a threshold value.

Figure 9:
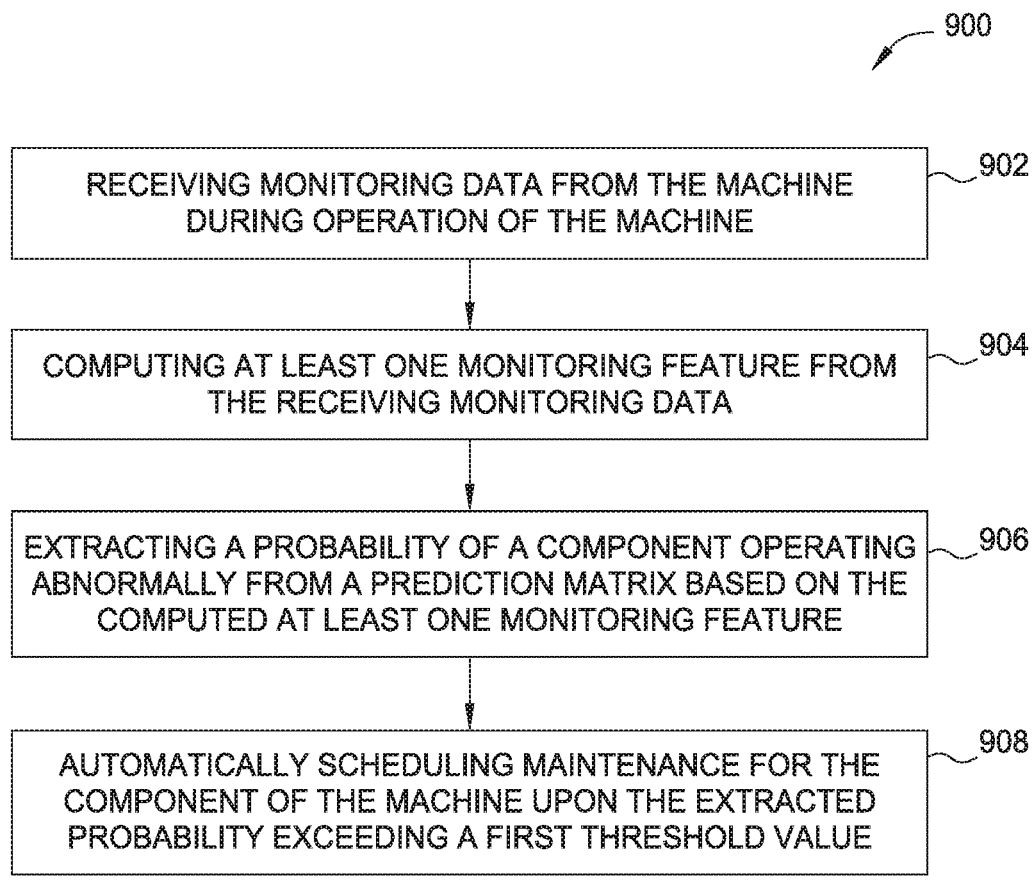
FIG. 9 is a flow chart of a method, according to one aspect, for predicting abnormal operation of a machine.

FIG. 9 illustrates a method 900 according to at least one aspect for predicting abnormal operation of an APU. For example, the abnormal operation prediction application 808 in FIG. 8 could execute the method 900 on the computer processor 802. In block 902, monitoring data is received from the APU. For example, the real-time or near-real-time monitoring data 116 can be received. In block 904, at least one monitoring feature is computed from the received monitoring data. As discussed above, the at least one monitoring feature is informative of a particular abnormal operation and could be a normalized monitoring feature. In block 906, a probability of the APU operating abnormally is extracted from a prediction matrix based on the at least one monitoring feature. As discussed above with reference to FIG. 7, the prediction matrix could output different probabilities for the same mode of abnormal operation and/or could output different probabilities for different modes of abnormal operation. In block 908, maintenance for the APU is automatically scheduled upon the extracted at least one probability from the prediction matrix exceeding a threshold value.

Figure 10:
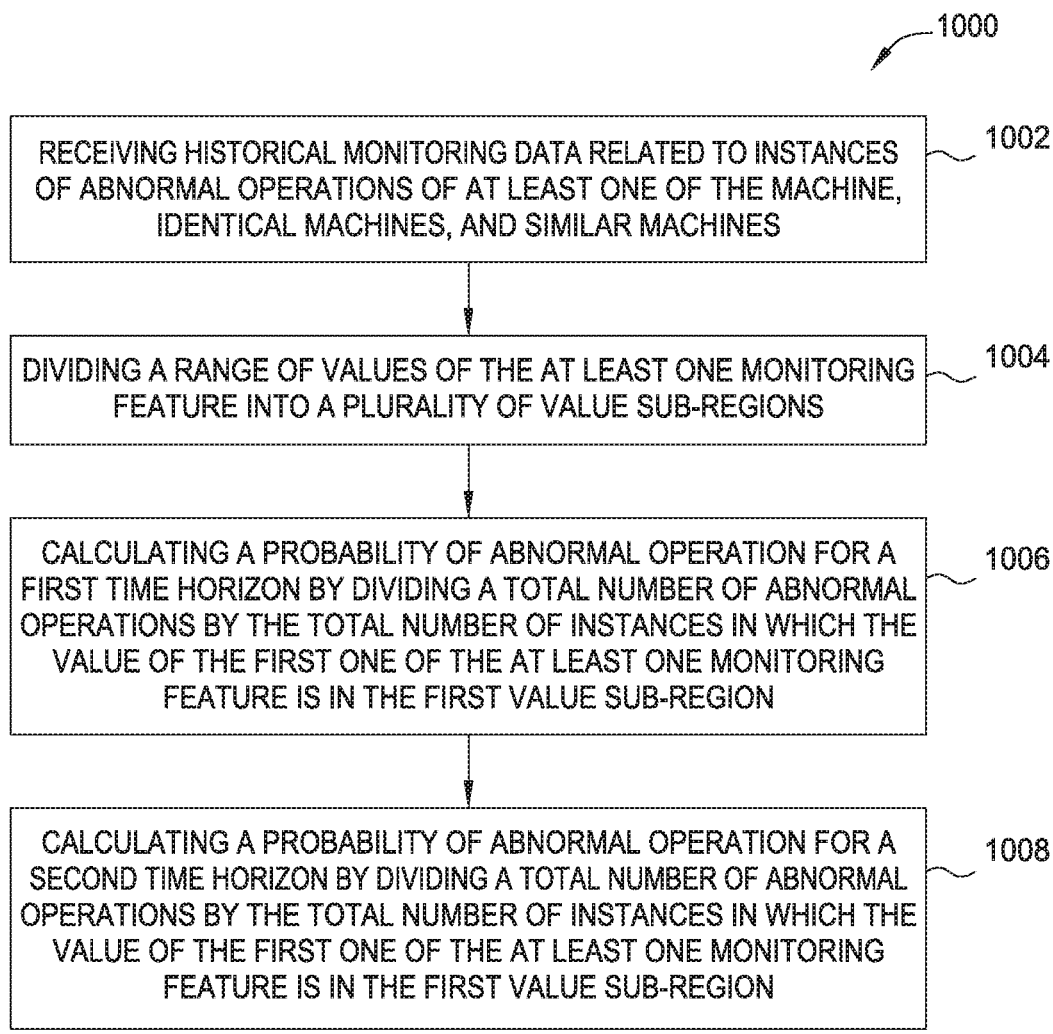
FIG. 10 is a flow chart of a method, according to one aspect, for generating a prediction matrix.

FIG. 10 illustrates a method 1000 according to at least one aspect for generating a prediction matrix (e.g., the prediction matrix 806. For example, the prediction matrix generating application 810 could execute the method 1000 on the computer processor 802. In block 1002, historical monitoring data related to instances of abnormal operations for an APU can be received. In various aspects, the historical monitoring data could include instances of abnormal operations for a group of APUs of the same type that are distributed across a fleet of aircraft. The received data can include the historical monitoring data 104 and the historical MMSG data 106, for example. In block 1004, values for at least one monitoring feature are determined based on the received data, and the range of values is divided into a plurality of value sub-regions. In block 1006, a probability of abnormal operations for a first time horizon is calculated by dividing a total number of abnormal operations by a total number of instances in which the value of the first one of the at least one monitoring feature is in the first value sub-region. In block 1008, a probability of abnormal operations for a second time horizon is calculated by dividing a total number of abnormal operations by a total number of instances in which the value of the first one of the at least one monitoring feature is in the first value sub-region. Blocks 1006 and/or 1008 are repeated for every prediction time horizon and every value sub-region to complete each prediction sub-matrix.

Figure 11:
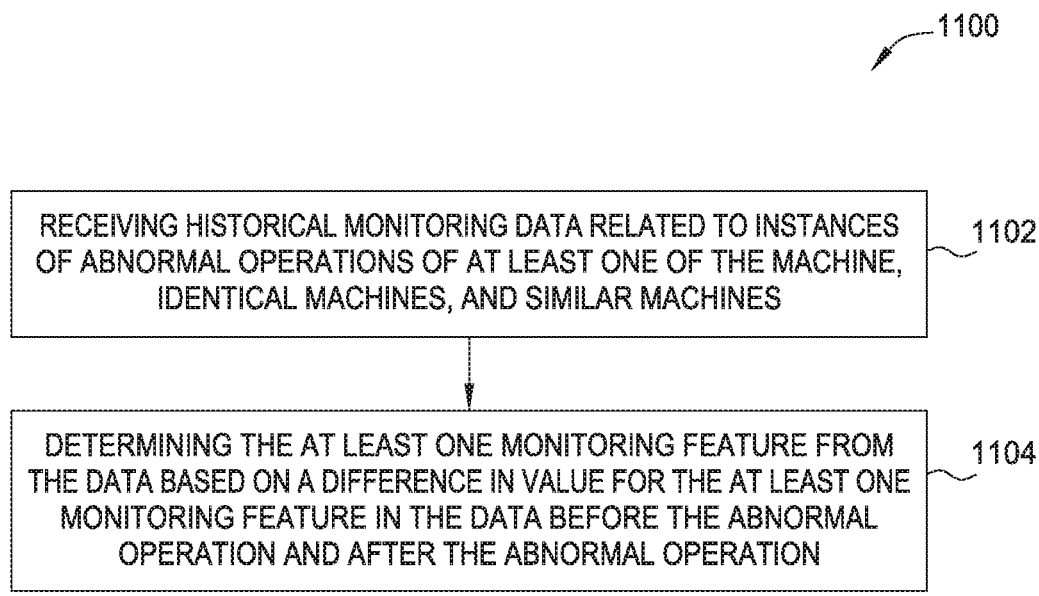
FIG. 11 is a flow chart of a method, according to one aspect, for determining informative monitoring features.

FIG. 11 illustrates a method 1100 according to at least one aspect for identifying and generating monitoring features based on monitoring data. For example, the monitoring feature generation application 812 could execute the method 1100 on the computer processor 802. In block 1102, historical monitoring data related to instances of abnormal operations of a group of APUs of the same type is received. The received data can include the historical monitoring data 104 and the historical MMSG data 106, for example. In block 1104, at least one monitoring feature from the data is determined based on a difference in value for the at least one monitoring feature in the data before the abnormal operation and after the operation. For example, if the difference in value exceeds a threshold amount, then a particular monitoring feature may be considered informative for predicting a mode of abnormal operation and therefore determined to be a monitoring feature for at least mode of abnormal operation.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

The aspects described herein may be a system, a method, and/or a computer program product. The computer program product may include a computer-readable storage medium (or media) having computer readable program instructions (i.e., program code) thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of at least one aspect, a user may access applications (e.g., at least one of the abnormal operation prediction application 808, the prediction matrix generating application 810, and the monitoring feature generation application 812) or related data available in the cloud. For example, the prediction matrix generating application 810 could execute on a computing system in the cloud and output the probability of an abnormal operation. In such a case, the prediction matrix generating application 810 could output the prediction matrix 806 and store the output prediction matrix 806 at a storage location in the cloud. Doing so allows a user to access this information from any computing system attached to a network connected to the cloud (e.g., the Internet).

In aspects described herein, abnormal operations of an APU can be predicted based on data that is already monitored. Put differently, no additional sensors need to be added to the APU to perform the processes described herein. By predicting abnormal operation APU, maintenance of the APU can be scheduled in advance of such abnormal operation to minimize any schedule disruptions for the APU and/or the aircraft powered by the APU.

Aspects have been described herein with reference to an APU. However, the aspects are also applicable to other machinery. For example, the aspects described herein are applicable to any gas turbine engine, such as a gas turbine engine providing thrust for an aircraft or a gas turbine engine used as a power plant. The aspects described herein could also be applicable to piston engines or other complex systems.

While the foregoing is directed to certain aspects, other and further aspects may be devised without departing from the basic scope thereof, and the scope thereof is determined by the claims that follow.

What is claimed is:

1. A computer-implemented method of predicting abnormal operation of a component of a machine, the method comprising:
   receiving monitoring data from the machine during operation;
   processing the monitoring data to determine values for one or more monitoring features that are predictive of abnormal operation of the component, wherein the one or more monitoring features comprise at least a first monitoring feature and a second monitoring feature;
   determining, using the values of the one or more monitoring features, a probability of abnormal operation of the component by extracting the probability from a set of values, wherein the set of values includes a first subset of values for the first monitoring feature and a second subset of values for the second monitoring feature, wherein the first subset of values includes probabilities of abnormal operation for combinations of values of the first monitoring feature of the one or more monitoring features and time horizons, wherein the second subset of values are related to abnormal operation of one of the component or a second component of the machine, and wherein the second subset of values includes probabilities of abnormal operation for combinations of values of one of the first monitoring feature or the second monitoring feature and time horizons; and
   scheduling maintenance for the component responsive to the probability exceeding a first threshold value.

2. The computer-implemented method of claim 1, wherein the set of values comprises a prediction matrix, and wherein the first set of values comprises a first prediction sub-matrix that includes the probabilities of abnormal operation for combinations of values of the first monitoring feature of the one or more monitoring features and time horizons.

3. The computer-implemented method of claim 2, wherein the second subset of values comprises a second prediction sub-matrix related to the abnormal operation of the second component of the machine, and wherein the second prediction sub-matrix includes the probabilities of abnormal operation for combinations of values of the second monitoring feature and time horizons.

4. The computer-implemented method of claim 2, wherein the second subset of values comprises a second prediction sub-matrix related to abnormal operation of the component, and
   wherein the second prediction sub-matrix includes the probabilities of abnormal operation for combinations of values of the second monitoring feature and time horizons.

5. The computer-implemented method of claim 4, wherein determining the probability of abnormal operation of the component comprises:
   extracting, from the first prediction sub-matrix and the second prediction sub-matrix, values of a maximum probability for a combination of a particular time horizon and values of the first monitoring feature and the second monitoring feature, respectively.

6. The computer-implemented method of claim 2, further comprising:
   generating the first prediction sub-matrix, wherein generating the first prediction sub-matrix includes:
      receiving historical monitoring data related to instances of abnormal operations of at least one of the machine, one or more machines of a same type as the machine, and one or more machines of a same class as the machine, wherein the instances of abnormal operations includes data for a first monitoring feature of the one or more monitoring features for: a first period before an abnormal operation of the component, and a second period after repair of the machine following the abnormal operation;
      dividing a range of values of the one or more monitoring features into a plurality of value sub-regions; and
      for each value sub-region:
         calculating a probability of abnormal operation for a first time horizon by dividing a total number of abnormal operations by a total number of instances in which the value of the first monitoring feature is in the value sub-region; and
         calculating a probability of abnormal operation for a second time horizon by dividing a total number of abnormal operations by the total number of instances in which the value of the first monitoring feature is in the value sub-region.

7. The computer-implemented method of claim 1, further comprising:
   determining the one or more monitoring features, wherein determining the one or more monitoring features comprises:
      receiving historical monitoring data related to instances of abnormal operations of at least one of: the machine, one or more machines of a same type as the machine, and one or more machines of a same class as the machine, wherein the instances of abnormal operations include data for: a first period before an abnormal operation of the component, and a second period after repair of the machine following the abnormal operation; and computing the one or more monitoring features from the data based on a difference in value for the one or more monitoring features in the data before the abnormal operation and after the abnormal operation.

8. A system, comprising:
a computer processor; and
a computer memory storing program code executable by the computer processor to:
receive monitoring data from a machine during operation;
determine the one or more monitoring features by:
receiving historical monitoring data related to instances of abnormal operations of at least one of: the machine, one or more machines of a same type as the machine, and one or more machines of a same class as the machine, wherein the instances of abnormal operations include data for: a first period before an abnormal operation of the component, and a second period after repair of the machine following the abnormal operation; and
computing the one or more monitoring features from the historical monitoring data based on a difference in value for the one or more monitoring features in the historical monitoring data before an abnormal operation and after an abnormal operation;
process the monitoring data to determine values for the one or more monitoring features that are predictive of abnormal operation of a component of the machine;
determine, using the values for the one or more monitoring features, a probability of abnormal operation of the component; and
schedule maintenance for the component responsive to the probability exceeding a first threshold value.

9. The system of claim 8,
wherein the computer memory further stores a prediction matrix that includes probabilities of abnormal operation for the component, and
wherein the prediction matrix includes a first prediction sub-matrix that includes probabilities of abnormal operation for combinations of values of a first monitoring feature of the one or more monitoring features and time horizons.

10. The system of claim 9,
wherein the one or more monitoring features include a second monitoring feature,
wherein the prediction matrix further includes a second prediction sub-matrix related to abnormal operation of a second component of the machine, and
wherein the second prediction sub-matrix includes probabilities of abnormal operation for combinations of values of the second monitoring feature and time horizons.

11. The system of claim 9,
wherein the one or more monitoring features include a second monitoring feature,
wherein the prediction matrix further includes a second prediction sub-matrix related to abnormal operation of the component, and
wherein the second prediction sub-matrix includes probabilities of abnormal operation for combinations of values of the second monitoring feature and time horizons.

12. The system of claim 11, wherein determining the probability of abnormal operation of the component comprises:
extracting, from the first prediction sub-matrix and the second prediction sub-matrix, values of a maximum probability for a combination of a particular time horizon and values of the first monitoring feature and the second monitoring feature, respectively.

13. The system of claim 9, wherein the program code is further (Original) executable by the computer processor to generate the first prediction sub-matrix by:
receiving historical monitoring data related to instances of abnormal operations of at least one of the machine, one or more machines of a same type as the machine, and one or more machines of a same class as the machine, wherein the instances of abnormal operations includes data for a first monitoring feature of the one or more monitoring features for: a first period before an abnormal operation of a component, and a second period after repair of the machine following the abnormal operation;
dividing a range of values of the one or more monitoring features into a plurality of value sub-regions; and
for each value sub-region:
calculating a probability of abnormal operation for a first time horizon by dividing a total number of abnormal operations by a total number of instances in which the value of the first monitoring feature is in the value sub-region; and
calculating a probability of abnormal operation for a second time horizon by dividing a total number of abnormal operations by the total number of instances in which the value of the first monitoring feature is in the value sub-region.

14. A computer program product comprising:
a non-transitory computer-readable storage medium having computer-readable program code embodied therewith, the computer-readable program code executable by one or more computer processors to:
receive monitoring data from a machine during operation;
process the monitoring data to determine values for one or more monitoring features that are predictive of abnormal operation of a component of the machine;
generate a first subset of values of a set of values by:
receiving historical monitoring data related to instances of abnormal operations of at least one of the machine, one or more machines of a same type as the machine, and one or more machines of a same class as the machine, wherein the instances of abnormal operations includes data for a first monitoring feature of the one or more monitoring features for: a first period before an abnormal operation of the component, and a second period after repair of the machine following the abnormal operation;
dividing a range of values of the one or more monitoring features into a plurality of value sub-regions; and
for each value sub-region:
calculating a probability of abnormal operation for a first time horizon by dividing a total number of abnormal operations by a total number of instances in which the value of the first monitoring feature is in the value sub-region; and
calculating a probability of abnormal operation for a second time horizon by dividing a total number of abnormal operations by the total number of instances in which the value of the first monitoring feature is in the value sub-region;

determine, using the values of the one or more monitoring features, a probability of abnormal operation of the component using the set of values; and schedule maintenance for the component responsive to the probability exceeding a first threshold value.

15. The computer program product of claim 14, wherein determining the probability of abnormal operation of the component comprises extracting the probability from the first set of values, wherein the first set of values comprises a prediction matrix, and wherein the first set of values comprises a first prediction sub-matrix that includes probabilities of abnormal operation for combinations of values of a first monitoring feature of the one or more monitoring features and time horizons.

16. The computer program product of claim 15, wherein the one or more monitoring features include a second monitoring feature, wherein the prediction matrix further includes a second prediction sub-matrix related to abnormal operation of a second component of the machine, and wherein the second prediction sub-matrix includes probabilities of abnormal operation for combinations of values of the second monitoring feature and time horizons.

17. The computer program product of claim 15, wherein the one or more monitoring features include a second monitoring feature, wherein the prediction matrix further includes a second prediction sub-matrix related to abnormal operation of the component of the machine, and wherein the second prediction sub-matrix includes probabilities of abnormal operation for combinations of values of the second monitoring feature and time horizons.

18. The computer program product of claim 15, wherein the computer-readable program code is further executable to determine the one or more monitoring features by:

receiving historical monitoring data related to instances of abnormal operations of at least one of the machine, one or more machines of a same type as the machine, and one or more machines of a same class as the machine, wherein the instances of abnormal operations includes data for: a first period before an abnormal operation of the component, and a second period after repair of the machine following the abnormal operation; and computing the one or more monitoring features from the data based on a difference in value for the one or more monitoring features in the data before the abnormal operation and after the abnormal operation.

* * * * *

UNITED STATES PATENT AND TRADEMARK OFFICE
CERTIFICATE OF CORRECTION

| | |
|---|---|
| PATENT NO. | : 11,816,590 B2 |
| APPLICATION NO. | : 16/782480 |
| DATED | : November 14, 2023 |
| INVENTOR(S) | : Shahriar Alam et al. |

It is certified that error appears in the above-identified patent and that said Letters Patent is hereby corrected as shown below:

In the Claims

In Column 20, Line 10, in Claim 13, after "further" delete "(Original)".

In Column 22, Line 12, in Claim 18, delete "15," and insert -- 14, --.

Signed and Sealed this
Sixteenth Day of July, 2024

Katherine Kelly Vidal
*Director of the United States Patent and Trademark Office*